US007456859B2

(12) United States Patent
Asahi et al.

(10) Patent No.: US 7,456,859 B2
(45) Date of Patent: Nov. 25, 2008

(54) IMAGE PICKUP DEVICE

(75) Inventors: Hiroaki Asahi, Tokyo (JP); Kazunori Kawasaki, Tokyo (JP)

(73) Assignee: IHI Aerospace Co., Ltd., Tokyo (JP)

( * ) Notice: Subject to any disclaimer, the term of this patent is extended or adjusted under 35 U.S.C. 154(b) by 677 days.

(21) Appl. No.: 10/546,295

(22) PCT Filed: Feb. 19, 2004

(86) PCT No.: PCT/JP2004/001861

§ 371 (c)(1),
(2), (4) Date: Aug. 22, 2005

(87) PCT Pub. No.: WO2004/074768

PCT Pub. Date: Sep. 2, 2004

(65) Prior Publication Data

US 2006/0177147 A1 Aug. 10, 2006

(30) Foreign Application Priority Data

Feb. 20, 2003 (JP) ............................ 2003-042783

(51) Int. Cl.
*H04N 7/18* (2006.01)

(52) U.S. Cl. ........................ 348/127; 348/125; 361/144

(58) Field of Classification Search ................. 348/127, 348/125; 373/2, 10, 144, 60–63
See application file for complete search history.

(56) References Cited

U.S. PATENT DOCUMENTS 4,121,292 A 10/1978 Galanis et al.
5,155,651 A * 10/1992 Yoda et al. .................. 361/144
5,917,602 A * 6/1999 Bonewitz et al. ............ 356/614

FOREIGN PATENT DOCUMENTS

JP 54-15768 A 2/1979
JP 11-90658 A 4/1999
JP 2002-206865 A 7/2002

* cited by examiner

*Primary Examiner*—Lin Ye
*Assistant Examiner*—Mekonnen Dagnew
(74) *Attorney, Agent, or Firm*—Sughrue Mion, PLLC

(57) ABSTRACT

The present invention is an image pickup device provided with a CMOS camera which is provided with a telecentric lens to photograph a sample put in a levitation state at the center inside an electrostatic levitation furnace, a metal halide light source which is positioned on the opposite side of the sample from the CMOS camera to irradiate light with a wavelength of 400 to 450 nm toward the sample, and a digital signal processor which performs image processing for enhancing an edge of an image captured by the CMOS camera in real time to output a position of center of gravity of the sample put in the levitation state, where a blue filter is attached to the CMOS camera. Even if the sample becomes incandescent due to a high temperature, contrast of the sample against a background can be obtained by the image pickup device. In addition, position information required for levitation control of a sample with a complicated shape is outputted by the image pickup device so that an instant at which the sample with a complicated shape changes to a spherical shape one can be specified visually.

3 Claims, 3 Drawing Sheets

1 ··· image pickup device
2 ··· CMOS camera
3 ··· metal halide (background light source)
4 ··· digital signal processor
5 ··· telecentric lens
10 ··· electrostatic levitation furnace 1 ··· image pickup device
2 ··· CMOS camera
3 ··· metal halide (background light source)
4 ··· digital signal processor
5 ··· telecentric lens
10 ··· electrostatic levitation furnace

IMAGE PICKUP DEVICE

TECHNICAL FIELD

The present invention relates to an image pickup device which is used to determine an instant at which a sample is melted while recognizing a position of the sample put in a levitation state when performing heating process on the sample in an electrostatic levitation furnace.

BACKGROUND ART

The electrostatic levitation furnace, after charging a sample inputted between main electrodes utilizing electrode contact, ultraviolet ray irradiation, or heating, puts the sample to a levitation state by an electrostatic field generated between the main electrodes, while maintaining the sample at a predetermined position by controlling a potential between the main electrodes or auxiliary electrodes, and irradiates laser light on the sample to heat and melt the same. By cooling and solidifying the sample thus heated and melted, crystals can be produced in a state that external interference has been excluded.

It is necessary to control levitation of a sample so as to prevent swinging of the sample or suppress the same as much as possible through generating crystal in the electrostatic levitation furnace in order to improve quality, and it is important to recognize a position of the sample accurately in order to perform control on such sample levitation.

Conventionally, as a means of recognizing a position of a sample, for example, there are a position recognizing method which uses laser light as background light and detects the highest luminescent spot or a statistical center of the luminescent spots except for a portion shielded by a sample formed in an almost spherical shape using a photo sensor to output position information, and a position recognizing method which uses laser light as background light like the above approach and processes an image of a sample photographed by a CCD camera to calculate a position of the center of gravity and output the same as position information.

In the conventional art, however, since a position of the center of gravity of the sample is not calculated in the former position recognizing method, the method does not excel at accuracy in position recognition of a sample except a spherical one. As a result, there is such a problem that it becomes considerably difficult or impossible to perform levitation control on a simple.

On the other hand, in the latter position recognizing method, the position of the center of gravity of a sample is calculated, but since it takes much time to perform image processing and a sampling speed required for levitation control can not be secured, there is such a problem that the latter method can be used only rarely.

Further, in case that a halogen lamp is used for the background light, when the sample becomes incandescent due to a high temperature, it is impossible to obtain a contrast of a sample against a background, so that laser light is adopted as the background light in the latter position recognizing method (see FIG. 3). However, for convenience of using a CCD camera, there is a problem about interference of laser light due to a camera lens.

Moreover, in the position recognizing methods, since such a constitution is employed that an instant at which a sample has melted is determined by measuring a temperature of the sample using a radiation thermometer, it is always required to correct an emissivity. There is such a problem that it is difficult to specify a melting time correctly. It is the conventional subject to solve these problems.

DISCLOSURE OF THE INVENTION

The present invention has been made in view of the subject in the conventional art, and an object of the present invention is to provide an image pickup device which can obtain a contrast of a sample against a background even if the sample becomes incandescent due to a high temperature, and can output position information required for levitation control on not only a spherical sample but also a sample with a further complicated shape in real time, thereby being capable of specifying an instant at which a sample with a complicated shape changes to a spherical one visually, that is, determining an instant at which the sample melts visually.

As the result of repeating keen examination for accomplishing the above object, the present inventors have found that the above object can be accomplished by combining a CMOS camera or a CCD camera for photographing a sample which is provided with a telecentric lens, a background light source which irradiates light with a wavelength of 400 to 600 nm on a sample, and a digital signal processor which performs image processing for edge enhancement in real time, and therefore have completed the present invention.

That is, an image pickup device according to the present invention is an image pickup device which monitors a sample to be subjected to heating process in a levitation state within an electrostatic levitation furnace to output position information, comprising: a CMOS camera or a CCD camera for photographing a sample which is provided with a telecentric lens, a background light source which is positioned on the opposite side of the sample from the CMOS camera or the CCD camera to irradiate light with a wavelength of 400 to 600 nm on the sample, and a digital signal processor which performs image processing for edge enhancement in real time to output a position of center of gravity of the sample put in the levitation state.

In a preferable embodiment of the image pickup device of the present invention, a metal halide light source which irradiates light with a wavelength of 400 to 450 nm is used as the background light source, and in a more preferable embodiment of the image pickup device of the present invention, a color filter for changing spectral characteristics is attached to the telecentric lens of the CMOS camera or the CCD camera.

When a sample subjected to heating process within an electrostatic levitation furnace is monitored using the image pickup device of the present invention, it is desirable that respective CMOS cameras or CCD cameras of two image pickup devices are arranged to be orthogonal to each other to photograph. Further, in order to emphasize contrast of a sample against a background, it is desirable that a lens for condensing light irradiated from the background light source on a sample is provided between the background light source and the sample, but the present invention is not considered limited to this constitution.

In the image pickup device of the present invention, in case that a sample is subjected to heating process by the electrostatic levitation furnace, light is irradiated from the background light source on a sample put in a levitation state, contrast of the sample against a background levitated is thereby captured by the CMOS camera or the CCD camera, and a position of center of gravity is calculated from the captured image so that position information is outputted.

At that time, since the CMOS camera or the CCD camera photographing the sample is provided with the telecentric lens, a dimensional error of the image due to magnification change of the image can be corrected, that is, a size of the sample and a relative distance of a reference on the sample is not changed, even if the sample moves slightly on an optical axis, so that correct position information can be obtained.

Furthermore, since light with a wavelength of 400 to 600 nm is irradiated from the background light source, even if the sample becomes incandescent due to a high temperature, contrast of the sample against a background is eventually obtained. In addition, as regards a captured image of a sample, since the digital signal processor performs image processing for enhancing an edge of the image in real time to output a position of center of gravity required for levitation control, levitation melting of the sample with a complicated shape is made possible, so that an instant at which the sample with a complicated shape put in the levitation state changes to a spherical shape one can be determined visually.

In the image pickup device according to a preferable embodiment of the present invention, since the constitution described above is adopted, interference of light between lenses of the CMOS camera or the CCD camera can be avoided so that the captured image is further sharpened. In the image pickup device according to a more preferable embodiment of the present invention, since the constitution described above is adopted, contrast of a sample against a background can be obtained further surely.

BEST MODE FOR CARRYING OUT THE INVENTION

The present invention will be explained below in detail according to an embodiment, but a detailed constitution of the present invention is not considered limited to only the following embodiment.

Figure 1:
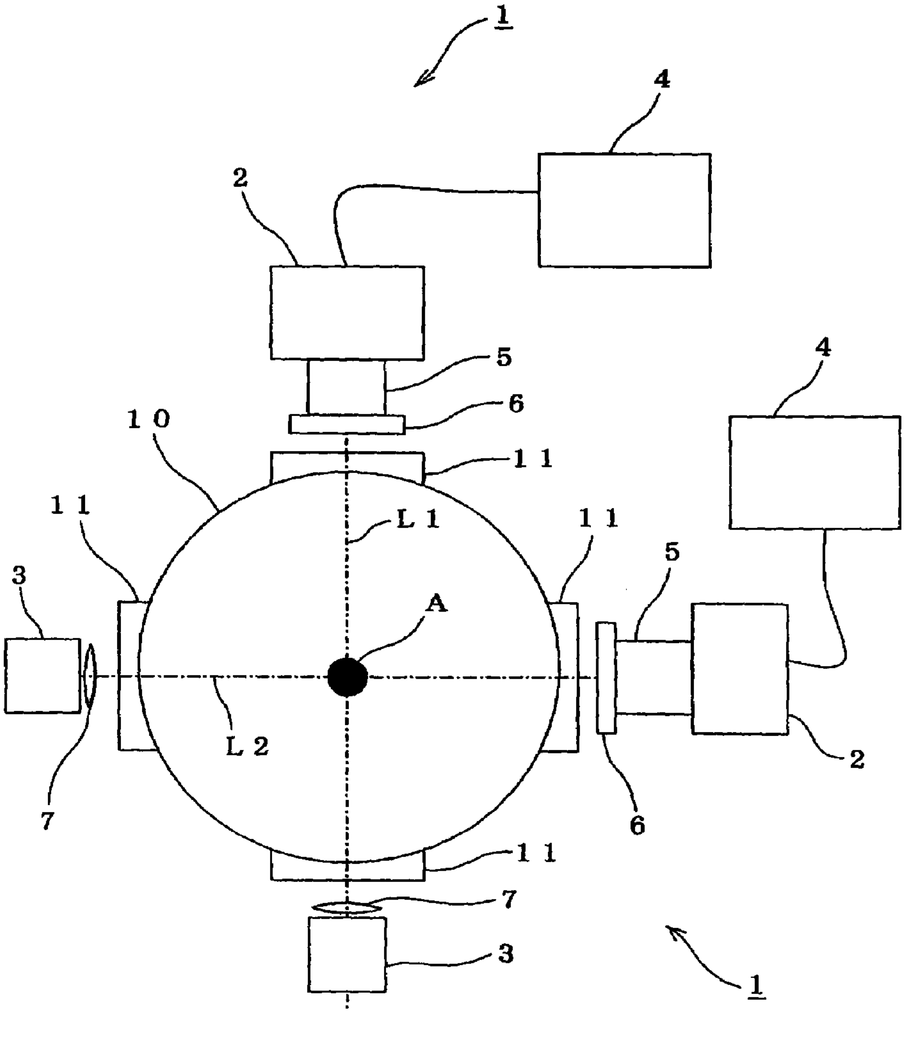
FIG. 1 is a schematic explanatory diagram showing one embodiment of an image pickup device of the present invention.

As schematically shown in FIG. 1, an electrostatic levitation furnace 10 is interiorly formed of an approximate cylindrical space, and the center of the space is set as a levitation position for a sample A. The electrostatic levitation furnace 10 is provided on a peripheral wall thereof with a plural of ports for access (not shown), and opening portions 11 are provided so as to correspond to arrangement of the ports for access.

Figure 2:
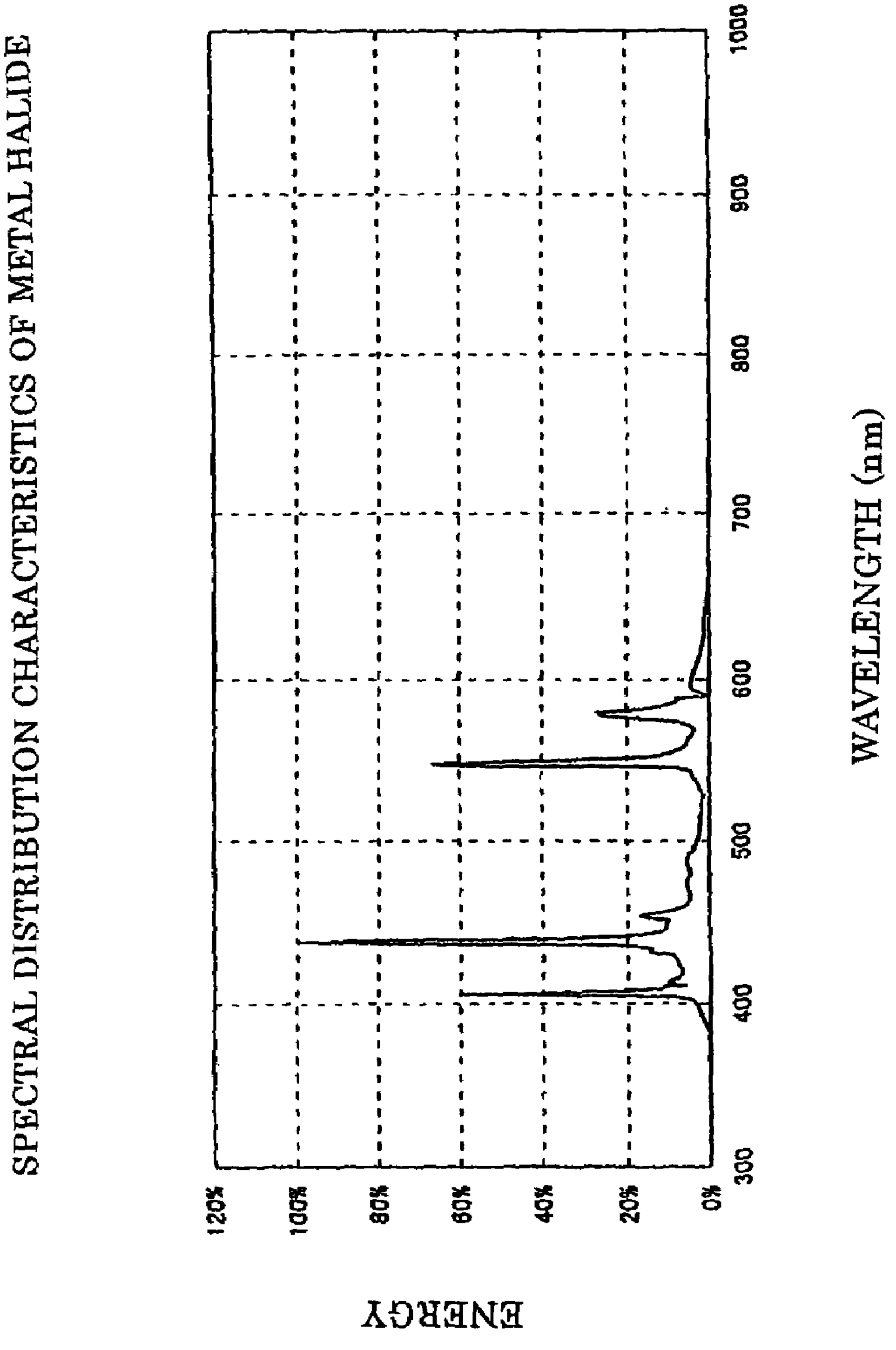
FIG. 2 is a graph showing spectral distribution characteristics of a metal halide serving as a background light source used in the image pickup device shown in FIG. 1.
Figure 3:
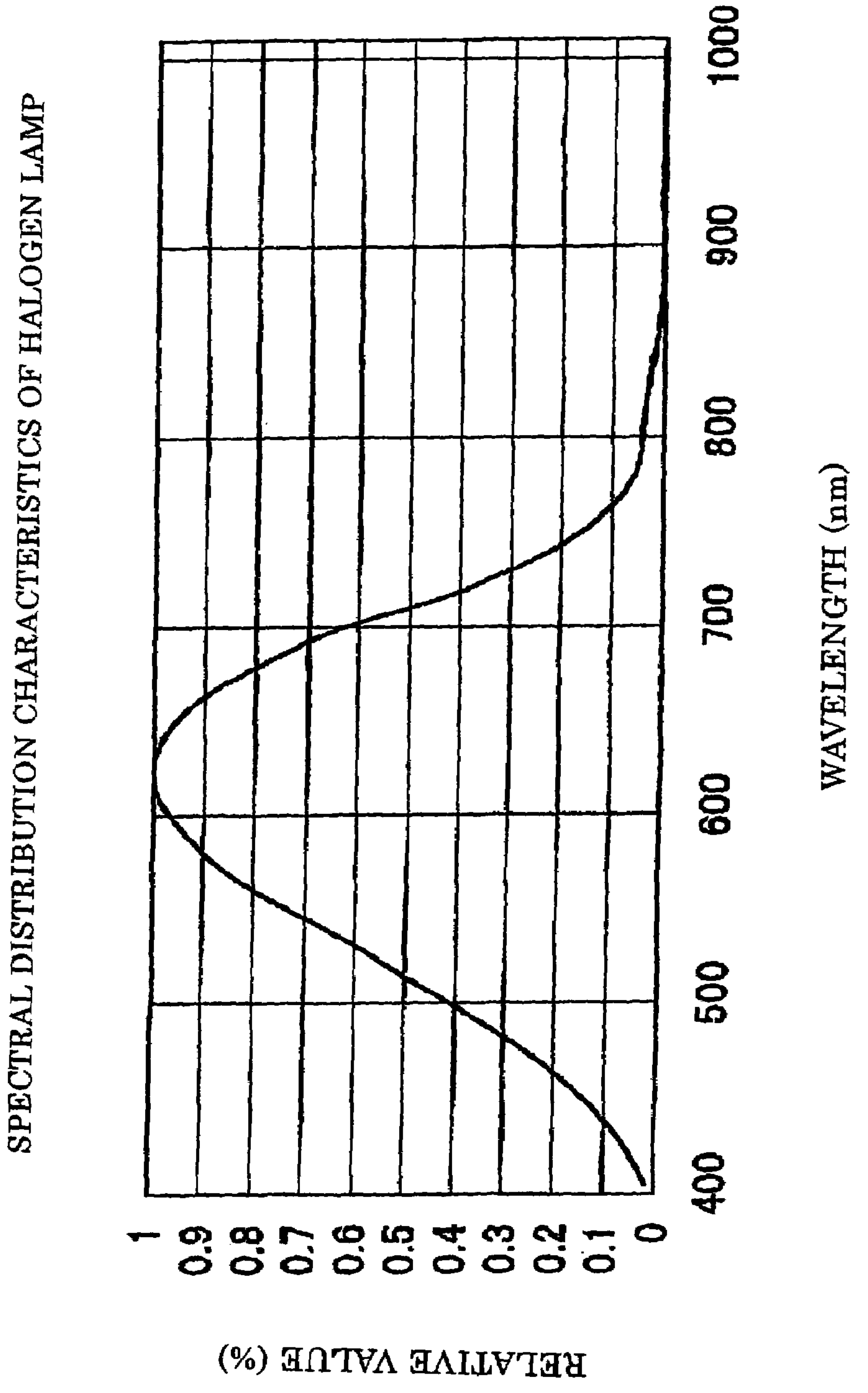
FIG. 3 is a graph showing spectral distribution characteristics of a halogen lamp.

An image pickup device 1 which monitors the sample A to be subjected to heating process in its levitation state within the electrostatic levitation furnace 10 to output position information of the sample is provided with a CMOS camera 2 which is mounted at the port for access in the vicinity of the opening portion 11 to photograph the sample A put in a levitation state at the center of the interior of the electrostatic levitation furnace 10, a metal halide light source 3 which is mounted on the ports for access positioned on the opposite side of the sample A from the CMOS camera 2 to irradiate light with a wavelength of 400 to 450 nm (see FIG. 2) toward the sample A and which serves as a background light sources, and a digital signal processor (DSP) 4 which performs image processing for enhancing an edge of an image captured by the CMOS camera 2 in real time to output a position of center of gravity of the sample A put in the levitation state.

The CMOS camera 2 is provided with a telecentric lens 5, which attaches a blue filter (a color filter) 6 for changing spectral characteristics. On the other hand, a lens 7 for condensing which condenses light irradiated from the metal halide light source 3 on the sample A is provided between the metal halide light source 3 and the opening portion 11.

In this embodiment, two sets of the image pickup devices 1 are prepared, and both the devices 1, 1 are arranged such that an optical axis L1 connecting the CMOS camera 2 and the metal halide light source 3 of one of the image pickup devices 1 and an optical axis L2 connecting the CMOS camera 2 and the metal halide light source 3 of the other of the image pickup devices 1 are orthogonal to each other.

In case that a sample A is subjected to heating process by the electrostatic levitation furnace 10, lights from the respective metal halide light sources 3, 3 of the image pickup devices 1, 1 are alternately irradiated on the sample A put in a levitation state, contrasts of the sample A against backgrounds emerging due to the irradiation are captured by the CMOS cameras 2, 2, and a position of center of gravity of the sample is calculated from these images to be outputted as position information.

At that time, since the CMOS camera 2 photographing a sample is provided with the telecentric lens 5, even if the sample A moves slightly on the optical axis L1 (or on the optical axis L2), a size of the sample A do not change, so that accurate position information can be obtained.

Besides, since light with a wavelength of 400 to 450 nm is irradiated from the metal halide light source 3 serving as a background light source, even if the sample A becomes incandescent due to a high temperature (2500K or so), contrast of the sample against a background can be obtained. In addition, as regards the captured image of the sample A, since the digital signal processor 4 performs image processing for enhancing an edge of the image at sampling intervals of 0.5 to 1 msec (desirably, or less) to output a position of center of gravity of a sample required for levitation control, levitation melting of a sample A with a complicated shape is made possible, so that an instant at which the sample with a complicated shape put in a levitation state changes to a spherical shape can be determined visually.

Further, in the image pickup device 1, since the metal halide light source 3 is adopted as the background light source, interference of light can be prevented from occurring between the lenses of the CMOS cameras 2, so that the captured image is further sharpened. Moreover, in the a image pickup device 1, since the blue filter (the color filter) 5 which changes spectral characteristics is attached to the CMOS camera 2 and the lens for condensing 7 is provided between the metal halide light source 3 and the opening portion 11, contrast of the sample A against a background is obtained further securely.

INDUSTRIAL APPLICABILITY

As explained above, in the image pickup device of the present invention, since the constitution is adopted, when a sample is subjected to heating process by an electrostatic levitation furnace, even if the sample becomes incandescent due to a high temperature, contrast of the sample against a background can be obtained and a position of center of gravity required for levitation control can be accurately outputted at a high speed. As a result, such a very high advantage can be attained that an instant at which a sample with a complicated shape put in a levitation state changes to a spherical shape one can be determined visually.

Further, in the preferable embodiment of the image pickup device of the present invention, since the constitution is adopted, a captured image obtained by a CMOS camera or a CCD camera can be more sharpened. Additionally, since the image pickup device as the more preferable embodiment of the present invention is constituted in the above manner, contrast of a sample against a background can be obtained further securely.

What is claimed is:

1. An image pickup device which monitors a sample to be subjected to heating process put in a levitation state within an electrostatic levitation furnace to output position information, comprising: a CMOS camera or a CCD camera for photographing a sample which is provided with a telecentric lens, a background light source which is positioned on the opposite side of the sample from the CMOS camera or a the CCD camera to irradiate light with wavelength of 400 to 60 nm on the sample, and a digital signal processor which performs image processing for edge enhancement in real time to output a position of center of gravity of the sample put in the levitation state.

2. An image pickup device according to claim 1, wherein a metal halide light source which irradiates light with a wavelength of 400 to 450 nm is used as the background light source.

3. An image pickup device according to claim 1, wherein a color filter which changes spectral characteristics is attached to the telecentric lens of the CMOS camera or the CCD camera.

* * * * *